May 16, 1939.  A. G. DOROS  2,158,747

TIRE WRAPPER REMOVING DEVICE

Filed June 1, 1938

Andrew G. Doros
INVENTOR

BY Victor J. Evans & Co.
ATTORNEYS

WITNESS J. P. Markey

Patented May 16, 1939

2,158,747

UNITED STATES PATENT OFFICE 2,158,747

TIRE WRAPPER REMOVING DEVICE

Andrew G. Doros, Elizabeth, N. J.

Application June 1, 1938, Serial No. 211,275

3 Claims. (Cl. 164—73)

This invention relates to cutting devices, and its general object is to provide a cutting device for use in removing the wrappers from tires, it being understood that tires and particularly tire casings for motor vehicles and the like are generally wrapped by strips of paper or other like material, in spiral formation with the strips disposed in overlapped edge to edge relation, and the cutting device which forms the subject matter of the present invention is capable of ripping through the wrapper about the entire circumference of the casing in an easy and expeditious manner, with minimum effort on the part of the user, regardless of the thickness and strength of the wrapping material.

A further object is to provide a cutting or ripping device for removing the wrapper from tires or the like, that is wrapped with the tire for immediate use when it is desired to remove the wrapper.

Another object is to provide a wrapping device of the character set forth, that is simple in construction, inexpensive to manufacture, and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
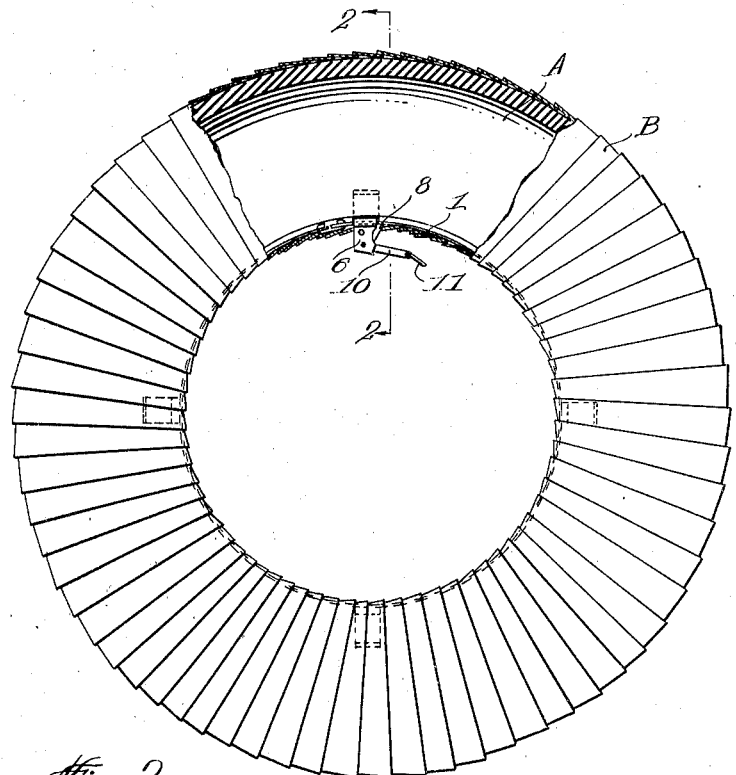
Figure 1 is a view partly in section illustrating my device in applied position with respect to the tire and the wrapper therefor.

Referring to the drawing in detail, the letter A indicates a tire casing and B the wrapper therefor, which as shown is a narrow strip of paper or like material disposed about the casing in spiral formation with the edges thereof in overlapped relation. Considerable difficulty is generally experienced in removing the wrapper, but by the use of my device it can be removed with minimum effort on the part of the user.

Figure 2:
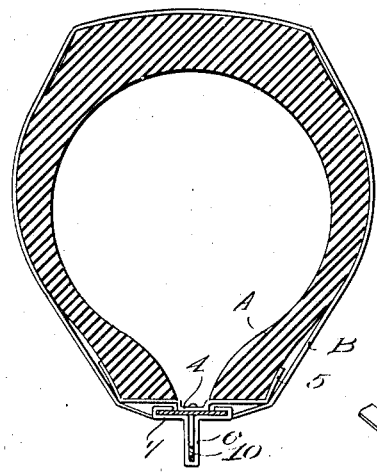
Figure 2 is a sectional view taken approximately on line 2—2 of Figure 1.

The device includes a metallic strip 1 of a length to fit within the inner circumference of the casing about the beads thereof for disposal between the wrapper and the casing, as shown in Figures 1 and 2. The strip 1 has slots 2 extending transversely thereof adjacent its ends to receive a link 3 for connecting the ends of the strip together in ring formation, to follow the shape of the inner circumference, as will be apparent.

The strip is secured to the casing by clamping members 4 riveted or otherwise fixed to the strip at intervals in its length and the clamping members are preferably formed from resilient metal to provide outwardly flared companion tongues 5 engaged with the outer surface of the walls of the casing, for cooperation with each other to set up a clamping action therewith.

Figure 3:
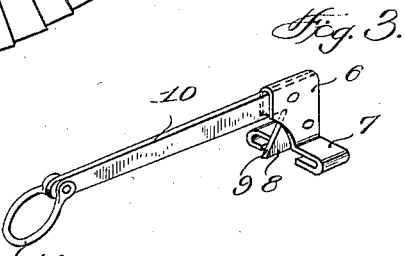
Figure 3 is a perspective view of the knife of my cutting device.
Figure 4:
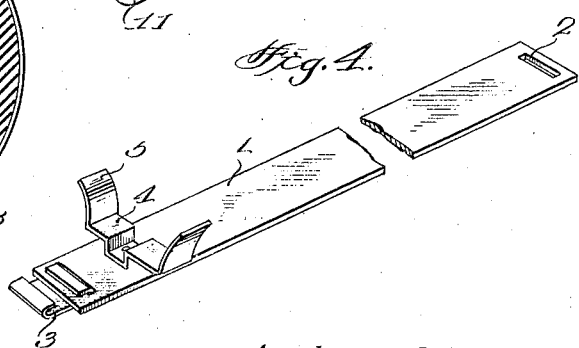
Figure 4 is a perspective view of the guiding member for the knife and which includes clamping means attached thereto.

The strip provides what may be termed a track or guide for the knife member which as best shown in Figure 3 includes a body formed from sheet material looped upon itself to provide spaced parallel walls 6 having formed thereon and extending outwardly at right angles thereto channel portions 7 that are mounted on the strip 1 for slidable movement to be guided accordingly as will be apparent upon inspection of Figure 2. Riveted or otherwise secured between the spaced parallel walls 6 is a substantially triangular shaped blade 8 having a beveled edge 9 that extends to the outer apex, as best shown in Figure 3. The handle of the knife member and which is indicated by the reference numeral 10 is preferably integral with the blade 8 but in any event has one end riveted or otherwise secured between the walls 6 and is seated in the loop thereof, while the opposite end has pivotally secured thereto a ring 11, to provide convenient gripping means for operating the knife, as will be apparent.

From the above description and disclosure of the drawing, it will be obvious that the apex portion of the blade is disposed in close proximity to the track or guide strip 1, so that when the knife is moved about the guide strip, the inclined beveled edge of the blade is directed against the wrapper to sever the same about the inner circumference of the casing. The body of the knife is initially arranged in engagement with or in close proximity to one side of the link 3, so that when it is moved about the guide strip for disposal on the opposite side of the link, the wrapper will be severed, as will be apparent upon inspection of Figure 1.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A tire wrapper removing device, comprising wrapper cutting means, guide means for the wrapper cutting means for disposal about the inner circumference of the tire and having the cutting means mounted thereon for slidable movement, means fixed to the guide means and including spring tongues for disposal in clamping engagement with the tire for securing the guide means thereto, said cutting means including a blade having an inclined beveled cutting edge, and a handle for the cutting means.

2. A tire wrapper removing device, comprising wrapper cutting means including a body, channel means formed on the body, a strip for disposal about the inner circumference of the tire and having the channel means slidably mounted thereon for guiding the cutting means, clamping members fixed to the strip at equi-distantly spaced intervals and including outwardly flared spring tongues for detachably securing the strip to the tire, said cutting means including a blade secured to the body and having an inclined beveled cutting edge, a handle secured to the body, and hand gripping means secured to the handle.

3. A tire wrapper removing device, comprising wrapper cutting means including a body, channel means formed on the body and extending outwardly therefrom for disposal upon opposite sides thereof, a strip for disposal about the circumference of the tire, a link for connecting the ends of the strip together for holding the latter in circular formation, said strip having the channel means slidably mounted thereon for guiding the cutting means, clamping means secured to the strip and including tongues disposed in gripping engagement with the tire for securing the strip thereto, and a handle for the cutting means.

ANDREW G. DOROS.